United States Patent
Sakayama

(10) Patent No.: US 10,652,428 B2
(45) Date of Patent: May 12, 2020

(54) INFORMATION PROCESSING APPARATUS, INFORMATION PROCESSING METHOD, AND NON-TRANSITORY COMPUTER READABLE STORAGE MEDIUM

(71) Applicant: FUJI XEROX CO., LTD., Tokyo (JP)

(72) Inventor: Takashi Sakayama, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/357,907

(22) Filed: Mar. 19, 2019

(65) Prior Publication Data

US 2019/0215417 A1 Jul. 11, 2019

Related U.S. Application Data

(63) Continuation of application No. 15/784,924, filed on Oct. 16, 2017, now Pat. No. 10,284,746.

(30) Foreign Application Priority Data

Mar. 28, 2017 (JP) ................. 2017-063576

(51) Int. Cl.
*H04N 1/333* (2006.01)
*H04W 4/02* (2018.01)
(Continued)

(52) U.S. Cl.
CPC ..... *H04N 1/33323* (2013.01); *H04N 1/00204* (2013.01); *H04N 1/00307* (2013.01); *H04N 1/00347* (2013.01); *H04N 1/327* (2013.01); *H04N 1/32507* (2013.01); *H04N 1/32765* (2013.01); *H04N 1/32776* (2013.01); *H04N 1/33353* (2013.01); *H04N 1/33361* (2013.01); *H04W 4/027* (2013.01); *H04W 72/04* (2013.01);
(Continued)

(58) Field of Classification Search
None
See application file for complete search history.

(56) References Cited

U.S. PATENT DOCUMENTS

| 6,393,031 B1 | 5/2002 | Isomura |
| 2005/0113106 A1* | 5/2005 | Duan ............ H04L 1/0002 455/452.2 |

(Continued)

FOREIGN PATENT DOCUMENTS

| JP | H11-252662 A | 9/1999 |
| JP | 2009-303107 A | 12/2009 |
| JP | 4716144 B2 | 7/2011 |

OTHER PUBLICATIONS

Jul. 17, 2018 Office Action issued in U.S. Appl. No. 15/784,924.

*Primary Examiner* — Frantz Bataille
(74) *Attorney, Agent, or Firm* — Oliff PLC

(57) ABSTRACT

An information processing apparatus includes plural communication units, a determination unit, and a controller. The plural communication units are configured to be capable of conducting a wireless communication. The determination unit is configured to determine a communication unit from among the plural communication units in accordance with whether a mobile communication terminal that is attempting to conduct a communication is approaching the information processing apparatus. The controller is configured to perform a control so as to start the communication using the communication unit determined by the determination unit.

13 Claims, 12 Drawing Sheets

(51) Int. Cl.
*H04W 72/04* (2009.01)
*H04N 1/327* (2006.01)
*H04N 1/00* (2006.01)
*H04N 1/32* (2006.01)

(52) U.S. Cl.
CPC ................ *H04N 2201/0036* (2013.01); *H04N 2201/0043* (2013.01); *H04N 2201/0055* (2013.01); *H04N 2201/0094* (2013.01); *H04N 2201/0096* (2013.01)

(56) References Cited

U.S. PATENT DOCUMENTS

2009/0103124 A1* 4/2009 Kimura ................ G06F 3/1209
358/1.15
2009/0111510 A1  4/2009 Ono
2016/0295072 A1* 10/2016 Nagasawa ............ H04N 1/4413

* cited by examiner

INFORMATION PROCESSING APPARATUS, INFORMATION PROCESSING METHOD, AND NON-TRANSITORY COMPUTER READABLE STORAGE MEDIUM

CROSS-REFERENCE TO RELATED APPLICATIONS

This application is a continuation of U.S. patent application Ser. No. 15/784,924 filed Oct. 16, 2017, which claims priority under 35 USC 119 from Japanese Patent Application No. 2017-063576 filed Mar. 28, 2017, the entire disclosures of which are hereby incorporated by reference in their entireties.

BACKGROUND

Technical Field

The present invention relates to an information processing apparatus, an information processing method, and a non-transitory computer readable storage medium.

SUMMARY

An information processing apparatus includes plural communication units, a determination unit, and a controller. The plural communication units are configured to be capable of conducting a wireless communication. The determination unit is configured to determine a communication unit from among the plural communication units in accordance with whether a mobile communication terminal that is attempting to conduct a communication is approaching the information processing apparatus. The controller is configured to perform a control so as to start the communication using the communication unit determined by the determination unit.

BRIEF DESCRIPTION OF THE DRAWINGS

Exemplary embodiments of the present invention will be described in detail based on the following figures, wherein.

DETAILED DESCRIPTION

First, prior to describing the present exemplary embodiment, premises of the present exemplary embodiment or an information processing apparatus using the present exemplary embodiment will be described. It should be noted that the descriptions are intended to facilitate understandings of the present exemplary embodiment.

In the related art, a smart phone or the like is equipped with multiple different communication units and selects a communication unit to be connected based on a specific priority or the like to conduct a communication.

In the technologies described in Japanese Patent No. 4716144 (corresponding to US 2009/0111510 A1), JP-A-11-252662 (corresponding to U.S. Pat. No. 6,393,031), and JP-A-2009-303107, when a communication is conducted (or prior to starting a communication), an optimum communication unit is selected and then the communication is conducted.

However, while one of the multiple communication units is selected and then the communication is conducted, the overall optimization may not be achieved due to later circumferences of the other communication units. For example, assuming that after a communication is started using a communication unit having a fast communication speed in response to a communication request from a certain communication device, a communication request is received from another communication device which is approaching the information processing apparatus. Even in this case, a communication unit having a slow communication speed is used. As a result, it takes time for the user having the "other communication device." Here, examples of the expression "approaching the information processing apparatus" includes a case where a user wants to perform an operation with the information processing apparatus. For example, the information processing apparatus is a printer, and the user is coming to get a printed matter. If the communication is conducted at a slow communication speed even though the user is approaching, the user may be forced to wait.

According to a present exemplary embodiment, the communication unit used in the communication that has been already being conducted is switched in this case so that a suitable communication unit for the approaching user is be selected and a communication is conducted by the selected communication unit.

Hereinafter, an exemplary embodiment suitable for implementing the present invention will be described with reference to the accompanying drawings.

Figure 1:
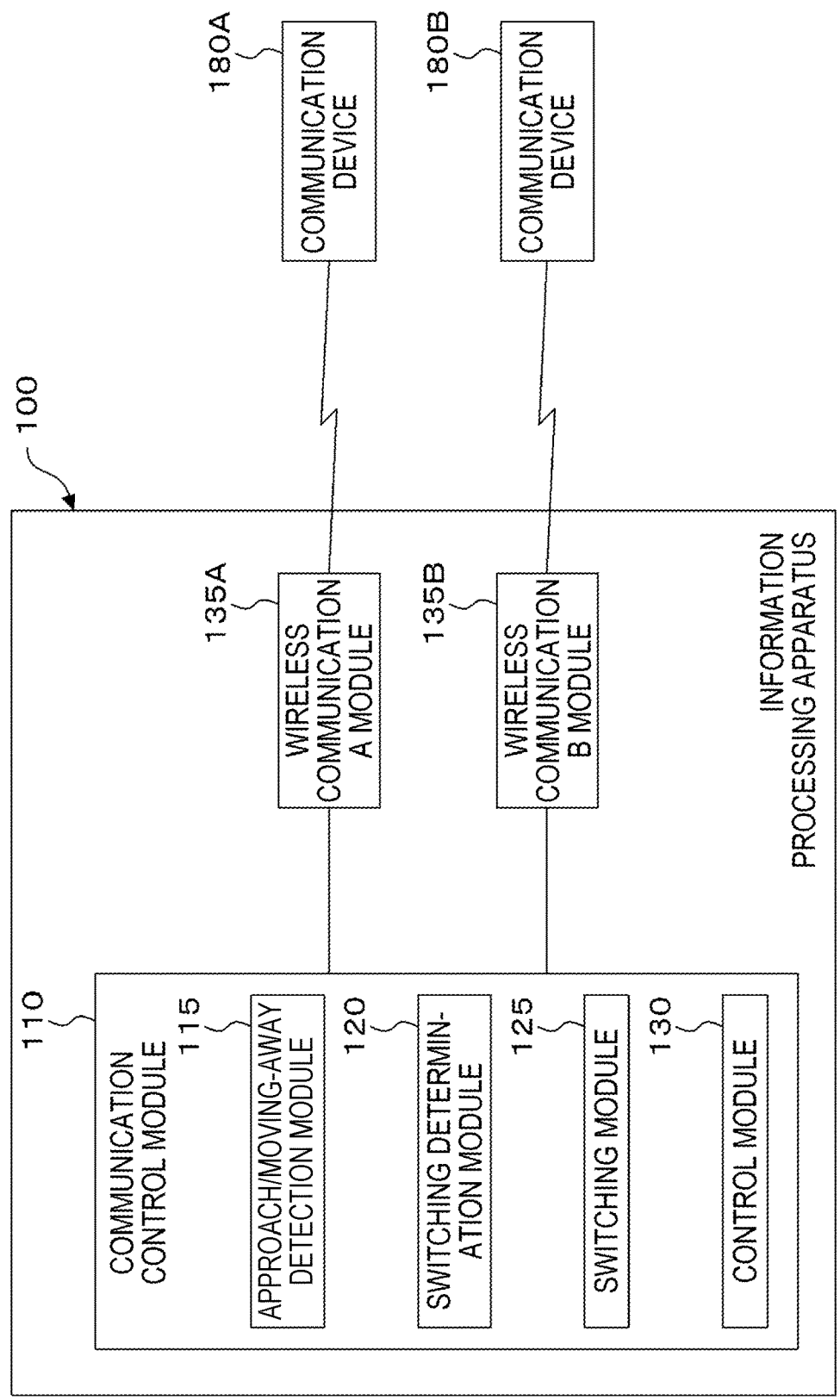
FIG. 1 is a view illustrating a conceptual module configuration relating to an exemplary configuration of an exemplary embodiment.

FIG. 1 is a view illustrating a conceptual module configuration relating to an exemplary configuration of the present exemplary embodiment.

A module, in general, indicates a logically separable component such as software (computer program) or hardware. Accordingly, a module in the present exemplary embodiment indicates not only a module in a computer program but also a module in a hardware configuration. Thus, the descriptions of the present exemplary embodiment also include descriptions of a computer program to serve as a module (a program that causes a computer to execute respective processes, a program that causes a computer to serve as respective units, and a program that causes a computer to implement respective functions), a system, and a method. For convenience of descriptions, the expressions "store," "caused to store," and equivalent expressions thereto will be used. If an exemplary embodiment is directed to a computer program, the expressions indicate storing data or the like in a memory device or performing a control to cause data or the like to be stored in a memory device. In addition, one module may correspond to one function. In implementation, however, one module may be configured with one program, multiple modules may be configured with one program, and in reverse, one module may be configured with multiple programs. Further, multiple modules may be executed by one computer, or one module may be executed by multiple computers in a distributed or parallel environment. In addition, one module may include another module. Hereinafter, the term "connection" is also used for a logical connection (for example, data exchange, instructions, and a reference relationship among data), in addition to a physical connection. The term "predetermined" refers to being determined prior to a target process. The term "predetermined" includes the meaning of being determined according to a circumstance/state at or until a specific time point not only before a process by the present exemplary embodiment is started, but also prior to a target process even after a process by the present exemplary embodiment is started. If multiple "predetermined values" exist, the values may be different from each other, or two or more of the values (or all values, of course) may be identical to each other. In addition, the description "when it is A, B is performed" indicates that "it is determined whether it is A, and if it is determined that it is A, B is performed," except for a case where it is unnecessary to make the determination as to whether it is A. If items are enumerated like "A, B, and C," the enumeration is merely exemplary and includes a case of selecting only one (for example, only A) of the items, unless otherwise specified.

In addition, a system or device includes a system or device which is implemented with one computer, hardware component, device or the like, in addition to a system or device configured such that multiple computers, hardware components, devices and the like are connected to each other by a communication unit such as a network (including a one-to-one corresponding communication connection). The terms "device" and "system" are synonymous with each other. Of course, the "system" does not include a system merely meaning a social "structure" (social system) which is an artificial engagement.

In addition, target information is read from a memory device per process by each module or for each of multiple processes which are executed in a module. After the process is executed, the process result is stored in the memory device. Accordingly, descriptions of reading from the memory device prior to the process and storing in the memory device after the process may be omitted. Examples of the memory device may include a hard disk, a random access memory (RAM), an external memory medium, a memory device through a communication line, a register within a central processing unit (CPU), and the like.

An information processing apparatus 100 of the present exemplary embodiment conducts a wireless communication with a communication device 180. The information processing apparatus 100 includes a communication control module 110, a wireless communication A module 135A, and a wireless communication B module 135B as illustrated in FIG. 1. The number of the wireless communication modules 135 may be three or more.

A communication device 180A is connected to the wireless communication A module 130A of the information processing apparatus 100 via a communication line. The communication device 180A is capable of conducting a wireless communication with the wireless communication A module 130A by a certain transmission method and channel.

A communication device 180B is connected to the wireless communication B module 130B of the information processing apparatus 100 via a communication line. The communication device 180B is capable of conducting a wireless communication with the wireless communication B module 130B by a certain transmission method and channel.

The communication device 180 is, for example, a portable information communication device (including a mobile phone, a smart phone, a mobile device, a wearable computer, and the like), a laptop PC or an access point. There may be provided multiple communication devices 180 that are capable of conducting a wireless communication with the information processing apparatus 100.

Each communication device 180 may conduct a wireless communication by multiple transmission methods and multiple channels.

The communication device 180 requests the information processing apparatus 100 to provide a service, through the wireless communication. Here, the "service" refers to a function or an operation provided by conducting the communication and is also called a job. For example, examples of the service include a printing process service for making a printing instruction and an image reading service for receiving an image reading result, with respect to an image processing apparatus 200 including the information processing apparatus 100.

The wireless communication A module 135A is connected to the communication control module 110 and also connected to the communication device 180A via the communication line. The wireless communication A module 135A is capable of conducting the wireless communication with the communication device 180A by the certain transmission method and channel. For example, the communication speed of the wireless communication A module 135A is different from the communication speed of the wireless communication B module 135B. In the following descriptions, for example, it is assumed that the communication speed of the wireless communication A module 135A is faster than the communication speed of the wireless communication B module 135B.

The wireless communication B module 135B is connected to the communication control module 110 and also connected to the communication device 180B via the communication line. The wireless communication B module 135B is capable of conducting the wireless communication with the communication device 180B by the predetermined transmission method and channel. For example, the communication speed of the wireless communication B module 135B is different from the communication speed of the wireless communication A module 135A. In the following descriptions, for example, it is assumed that the communication speed of the wireless communication B module 135B is slower than the communication speed of the wireless communication A module 135A.

Each wireless communication module 135 may be capable of conducting a wireless communication by multiple transmission methods and multiple channels. The multiple transmission methods may include, for example, IEEE802.11a, IEEE802.11b, IEEE802.11c, IEEE802.11g, IEEE802.11n, IEEE802.11ac, IEEE802.11j, IEEE802.11ad, and Bluetooth (registered trademark).

In addition, at least one of the transmission methods of the wireless communication module 135 may have multiple channels (wireless communication paths). Of course, each of all the transmission methods may have multiple channels.

The transmission methods by which the wireless communication module 135 is capable of conducting a wireless communication may include at least the communication standard of IEEE802.11ad.

The communication control module 110 includes an approach/moving-away detection module 115, a switching determination module 120, a switching module 125, and a control module 130. The communication control module 110 is connected to the wireless communication A module 135A and the wireless communication B module 135B. The communication control module 110 controls the wireless communication between the information processing apparatus 100 and the communication device 180.

The approach/moving-away detection module 115 detects whether the communication device 180 that is attempting to conduct a communication is approaching the information processing apparatus 100.

Here, examples of the "communication device 180 that is attempting to conduct a communication" may include a communication device 180 that is conducting a communication, as well as a communication device 180 that is making a communication request.

For example, the approach/moving-away detection module 115 may detect whether the communication device 180 is approaching, based on a change of the communication intensity in the communication of the wireless communication module 135. Specifically, if the communication intensity becomes stronger than before, it may be determined that the communication device 180 is approaching. If the communication intensity becomes weaker than before, it may be determined that the communication device 180 is moving away (or is not approaching). In addition, if a distance between the information processing apparatus 100 and the communication device 180 is measured by the transmission method of the wireless communication module 135, the distance may be used to detect whether the communication device 180 is approaching the information processing apparatus 100. In addition, if a request for start of a communication is received from the communication device 180, it may be detected whether a moving object having the communication device 180 is approaching, by using a camera, an ultrasonic wave sensor, an infrared sensor or the like. Specifically, the moving object is a user. The movement of a user who is in a direction at the time when the request for start of a communication is received from the communication device 180 may be detected.

If a communication Y is attempted to be started and if a communication X has been being conducted, the switching determination module 120 determines whether to use the wireless communication module 135 (either of the wireless communication A module 135A or the wireless communication B module 135B) that is being used in the communication X, for the communication Y. It is assumed that the communications X and Y are wireless communications having different communication speeds. Specifically, the communications X and Y have different transmission methods or channels.

For example, if the wireless communication A module 135A having the fast communication speed is being used in the communication X that has already been being conducted with the communication device 180A and if the communication device 180A is not approaching the information processing apparatus 100 but the communication device 180B that is attempting to start the communication Y is approaching the information processing apparatus 100, the switching determination module 120 may switch the wireless communication A module 135A to the wireless communication B module 135B in the communication with the communication device 180A, so as to use the wireless communication A module 135A for the communication with the communication device 180B.

Furthermore, in addition to determining whether the communication device 180 is approaching, the switching determination module 120 may determine whether to perform the switching of the wireless communication module 135 by comparing a priority (including a "priority level") of a service A that is conducting a communication with a priority of a service B that is attempting to start the communication Y. Here, the expression "switching of the wireless communication module 135" refers to (i) switching the wireless communication A module 135A (the communication speed of the wireless communication A module 135A is faster than that of the wireless communication B module 135B) that is being used in the communication X, to the wireless communication B module 135B (the communication speed of the wireless communication B module 135B is slower than that of the wireless communication A module 135A) or (ii) switching the number of channels. As a result, the wireless communication A module 135A is used for the communication Y.

Specifically, if the communication device 180B is approaching the information processing apparatus 100 and if the priority of the service B that is attempting to start the communication Y is higher than the priority of the service A that is conducting the communication, the switching determination module 120 may determine to perform the switching. In addition, the priority of the printing process service may be set to be higher than the priority of the image reading service.

In addition, for example, the switching determination module 120 may determine whether to perform the switching, by comparing a remaining data amount or remaining communication time of the service A that is conducting the communication X with a data amount or communication time of the service B that is attempting to start the communication Y.

The switching module 125 determines the wireless communication module 135 in accordance with whether the communication device 180 that is attempting to conduct a communication is approaching the information processing apparatus 100.

Then, the control module 130 performs a control to start a wireless communication using the wireless communication module 135 determined by the switching module 125.

In addition, if the communication device 180 is approaching the information processing apparatus 100, the switching module 125 may determine the wireless communication module 135 having the fastest communication speed among the wireless communication modules 135.

In addition, if the communication device 180 is approaching the information processing apparatus 100 and if the service that is attempting to conduct a communication is a predetermined service, the switching module 125 may determine the wireless communication module 135 having the fastest communication speed among the wireless communication modules 135. The "predetermined service" may be the printing process service.

In addition, if the communication device 180 is moving away from the information processing apparatus 100, the switching module 125 may not determine the wireless communication module 135 having the highest directivity among the wireless communication modules 135. Here, examples of the "wireless communication module 135 having a high directivity" include a wireless communication module 135 conducting a communication using the transmission method of IEEE802.11ad.

In addition, the switching module 125 may determine the wireless communication module 135 by using a time until the communication device 180 arrives at the information processing apparatus 100, a communication data amount, and a communication speed.

In addition, if the wireless communication module 135 has multiple channels and if the service that is conducting a communication uses the multiple channels, the switching module 125 may determine the wireless communication module 135 by reducing the number of channels and allocating the reduced channels to the service that is attempting to start a communication.

In addition, according to the determination made by the switching determination module 120, the switching module 125 may switch a wireless communication module 135 (for example, the wireless communication A module 135A having the fast communication speed) which is being used in a communication that has already been being conducted to another wireless communication module 135 (for example, the wireless communication B module 135B having the slow communication speed), and allocate the free wireless communication module 135 (for example, the wireless communication A module 135A having the fast communication speed) to the communication device 180 that is attempting to newly start a communication so as to conduct the communication.

Figure 2:
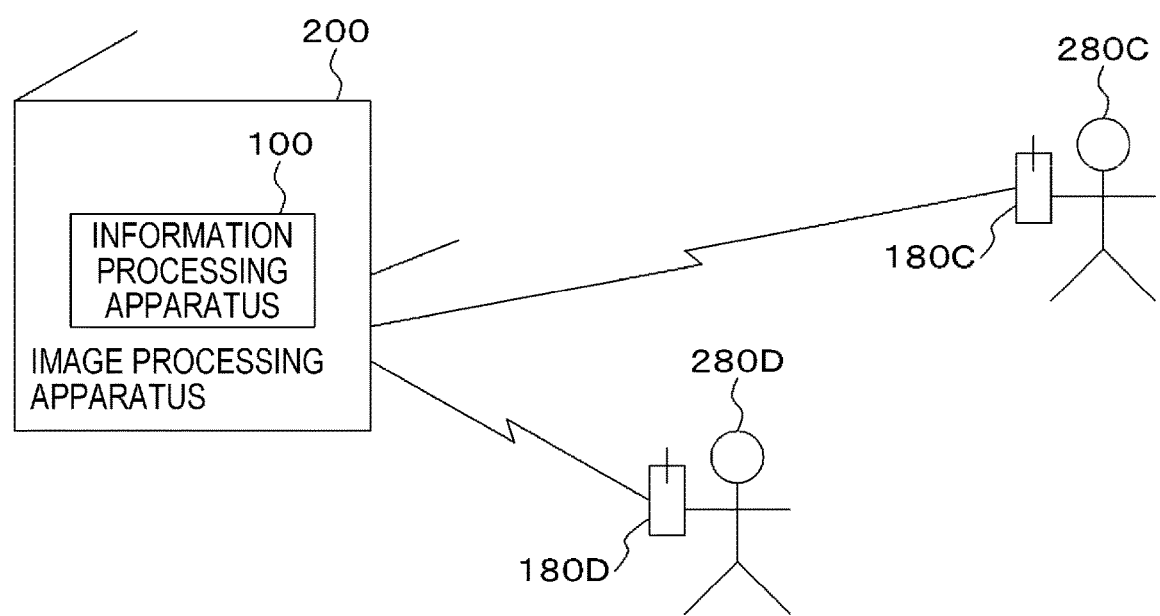
FIG. 2 is an explanatory view illustrating an exemplary system configuration using the exemplary embodiment.

FIG. 2 is an explanatory view illustrating an exemplary system configuration using the present exemplary embodiment.

The image processing apparatus 200 includes the information processing apparatus 100. The image processing apparatus 200, a communication device 180C of a user 280C, and a communication device 180D of a user 280D are connected to each other via communication lines. Especially, the image processing apparatus 200 is machine that is installed in an office or the like and used by multiple users. The image processing apparatus 200 may be used through the multiple communication devices 180 simultaneously. The image processing apparatus 200 is, for example, a copier, a facsimile, a scanner, a printer, or a multifunctional machine (an image processing apparatus having two or more functions of a scanner, a printer, a copier, a facsimile, and the like).

In the image processing apparatus 200, an optimal wireless communication module 135 is selected from the multiple wireless communication modules 135. Even if the selected wireless communication module 135 is being used in another service (another job), the wireless communication module 135 being used in communication is switched so that the communication may be conducted by an optimal wireless communication module 135.

Specific examples will be described.

Specific Example (1)

The user 280C is approaching the image processing apparatus 200 in order to perform a process (printing process service) of transmitting a printing instruction to the image processing apparatus 200 by operating the communication device 180C and getting the printed matter at the image processing apparatus 200. In this case, communication is conducted by allocating the wireless communication module 135 having the fastest communication speed (for example, the wireless communication module 135 using the transmission method of IEEE802.11ad) from among the multiple wireless communication modules 135.

Specific Example (2)

The user 280C is attempting to perform a process (image reading service) of transmitting a scanned image to the communication device 180C by performing a scanning operation for the image processing apparatus 200 and storing the image in the communication device 180C. Then, the user 280D is approaching the image processing apparatus 200 in order to perform a process (printing process service) of transmitting a printing instruction to the image processing apparatus 200 by operating the communication device 180D and getting the printed matter at the image processing apparatus 200. Meanwhile, the user 280C (the communication device 180C) who has finished the reading of the original document is ready to leave the image processing apparatus 200. This is because the reception of the image by the communication device 180C does not require the user 280C to stay in front of the image processing apparatus 200. If a wireless communication has already been being conducted with the communication device 180C by the transmission method of IEEE802.11ad, in order to conduct a communication with the communication device 180D, the wireless communication with the communication device 180C is switched to the wireless communication by the transmission method of IEEE208.11n through the above-described switching, and a wireless communication is conducted with the communication device 180D by the transmission method of IEEE802.11ad.

Figure 3:
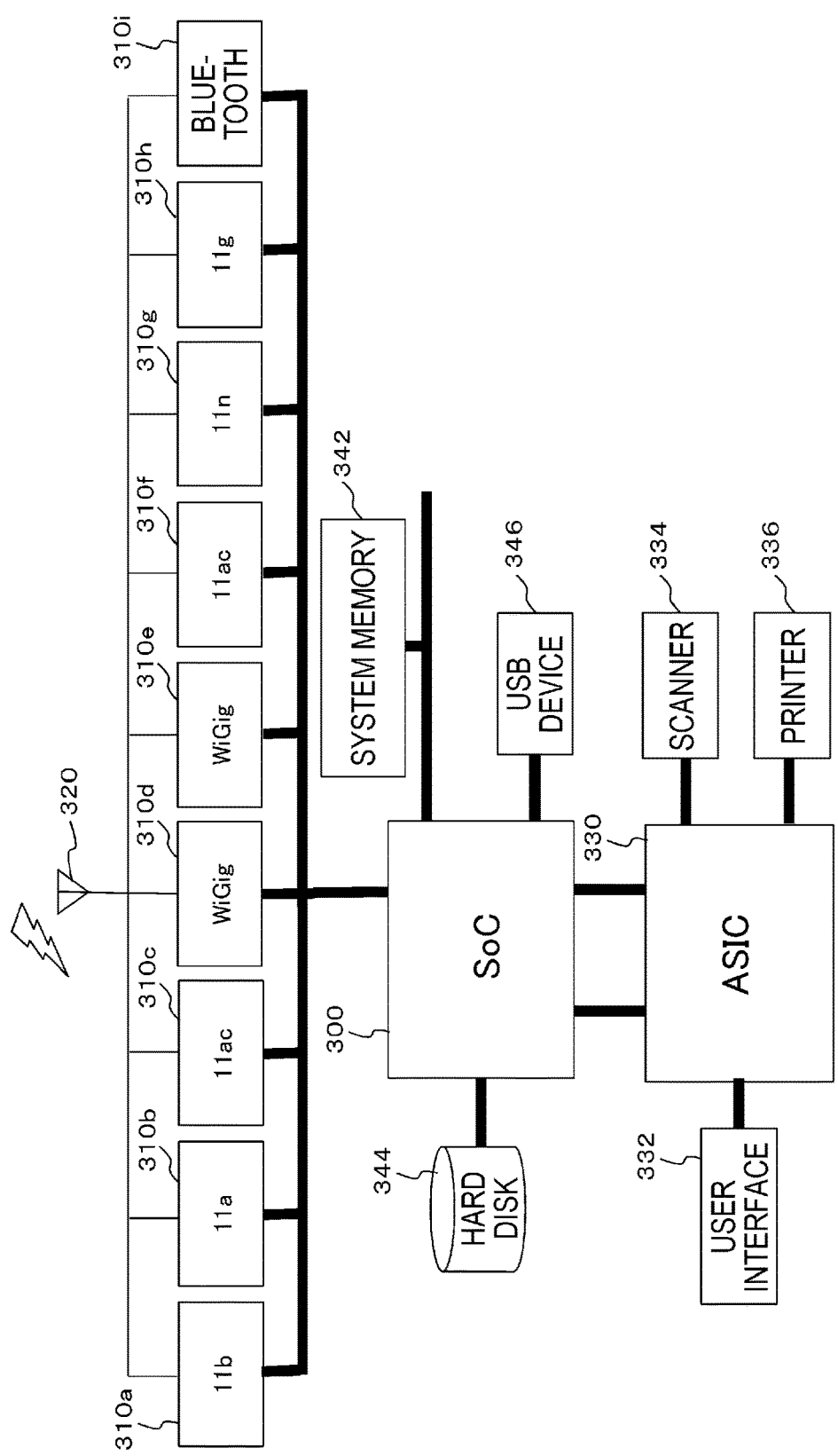
FIG. 3 is an explanatory view illustrating a specific exemplary configuration of the exemplary embodiment.

FIG. 3 is an explanatory view illustrating a specific exemplary configuration of the present exemplary embodiment (the image processing apparatus 200). The image processing apparatus 200 includes a system on a chip (SoC) 300, 11b:310a, 11a:310b, 11ac:310c, WiGig:310d, WiGig:310e, 11ac:310f, 11n:310g, 11g:310h, Bluetooth 310i, an antenna 320, a system memory 342, a hard disk 344, a USB device 346, an application specific integrated circuit (ASIC) 330, a user interface 332, a scanner 334, and a printer 336.

11b:310a is connected to the antenna 320 and the SoC 300. 11a:310b is connected to the antenna 320 and the SoC 300. 11ac:310c is connected to the antenna 320 and the SoC 300. WiGig:310d is connected to the antenna 320 and the SoC 300. WiGig:310e is connected to the antenna 320 and the SoC 300. 11ac:310f is connected to the antenna 320 and the SoC 300. 11n:310g is connected to the antenna 320 and the SoC 300. 11g:310h is connected to the antenna 320 and the SoC 300. Bluetooth 310i is connected to the antenna 320 and the SoC 300. The antenna 320 may be shared. Further, multiple antennas 320 may be provided. The combination of the communication devices (communication chips) 310 and the antenna 320 is an example implementing the wireless communication modules 135 illustrated in the example of FIG. 1. 11b:310a to 11g:310h comply with the "IEEE 802.11 standard" which is the international standard of the wireless communication standard and includes "a," "a/b," "b/g," "a/b/g/n," and the like. Of course, Wireless Fidelity (Wi-Fi) which is a product complying with the above-described standard may be used. Especially, IEEE802.11ad which is a wireless communication standard of the 60 GHz band may be adopted. That is, WiGig (Wireless Gigabit) which is a product complying with IEEE802.11ad may be used. As the transmission method of the wireless communication, transmission methods such as Bluetooth 310i other than the "IEEE802.11 standard" may be used.

The SoC 300 is connected to 11b:310a, 11a:310b, 11ac:310c, WiGig:310d, WiGig:310e, 11ac:310f, 11n:310g, 11g:310h, Bluetooth 310i, the system memory 342, the hard disk 344, the USB device 346, and the ASIC 330. The SoC 300 is an example implementing the communication control module 110. The SoC 300 mainly controls the communication devices (communication chips) 310, the system memory 342, the hard disk 344, and the USB device 346.

The system memory 342 is connected to the SoC 300. The system memory 342 is, for example, a memory used for executing programs of the communication control module 110.

The hard disk 344 is connected to the SoC 300. In the hard disk 344, for example, communication contents are stored.

The USB device 346 is connected to the SoC 300. The USB device 346 reads from and writes into, for example, an external connection device such as a removable storage medium and an IC card. In addition, another communication device may be connected.

The ASIC 330 is connected to the SoC 300, the user interface 332, the scanner 334, and the printer 336. The ASIC 330 controls the scanner 334, the printer 336, the user interface 332 and the like to implement the main functions of the image processing apparatus 200.

The user interface 332 is connected to the ASIC 330. The user interface 332 receives an operation by a user and presents a message or the like to the user by controlling, for example, a liquid crystal display also serving as a touch panel. In addition, the user interface 332 may receive the user's operation (including gaze, gesture, voice, and the like) using a mouse, a keyboard, a camera, a microphone or the like, and may present a message to the user by voice output from a loudspeaker or touch sense using a touching device.

The scanner 334 is connected to the ASIC 330. The scanner 334 reads an image of an original document and transmits the image.

The printer 336 is connected to the ASIC 330. The printer 336 performs printing according to a printing instruction received by the communication devices (communication chips) 310 or the user interface 332.

Figure 4A:
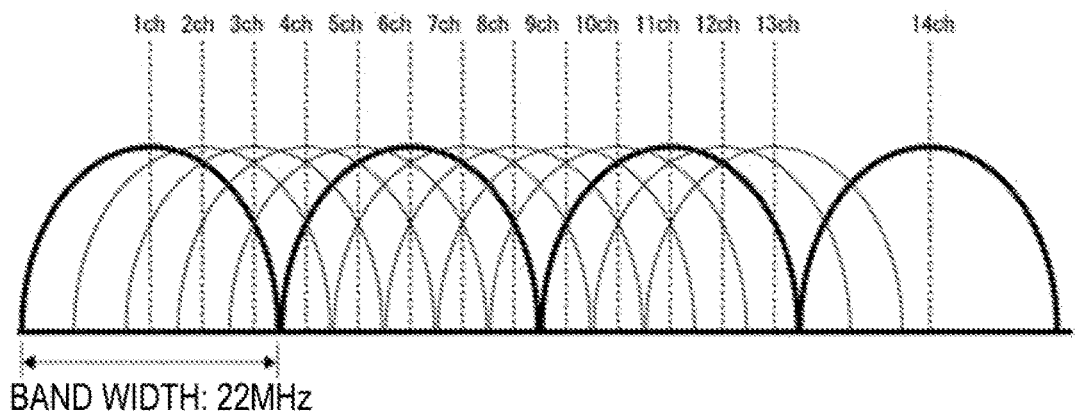
FIGS. 4A and 4B are explanatory views illustrating examples of channels.
Figure 4B:
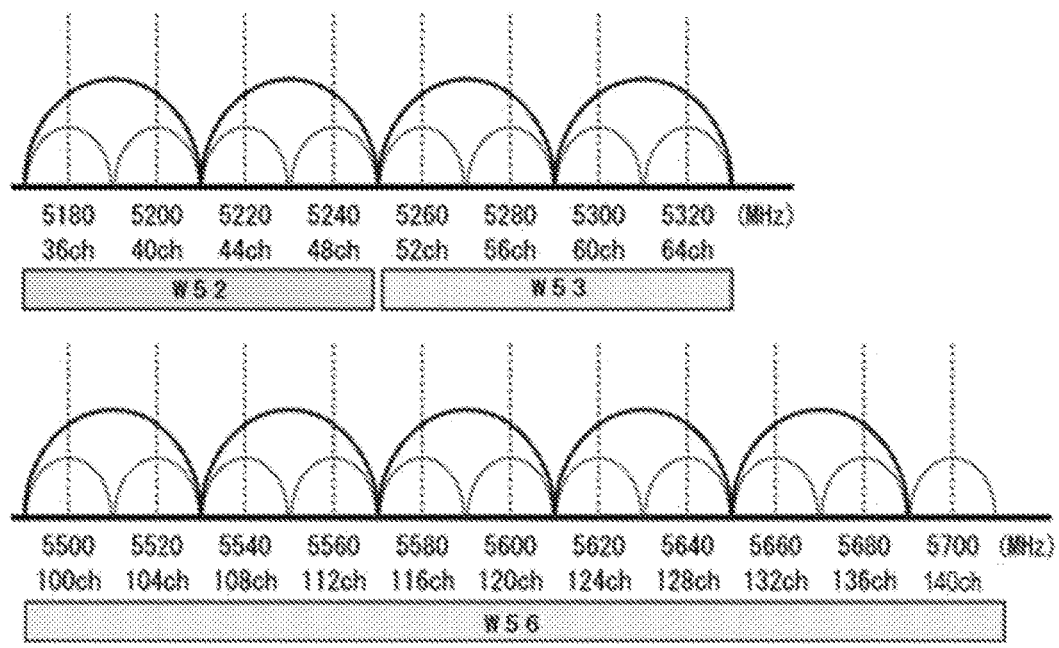

FIGS. 4A and 4B are explanatory diagrams illustrating examples of channels.

For example, descriptions will be made on channels in the "2.4 GHz band" and the "5 GHz band" of the "IEEE 802.11 standard."

The wireless standard using the "2.4 GHz band" is easily affected by other devices and is difficult to conduct a stable communication. For example, if a microwave oven or another identical wireless LAN device exists nearby, the communication often becomes unstable. Meanwhile, compared to the "5 GHz band," radio waves reach far away and are less affected by an obstacle or the like. Further, the "2.4 GHz band" is used by many devices and highly compatible.

Since the "5 GHz band" is used by a small number of devices, the "5 GHz band" is less affected by a microwave oven and the like and may be expected to conduct a stable communication. Meanwhile, when a blocking object exists, the "5 GHz band" is easily affected by the blocking object, as compared to the "2.4 GHz band," and may not conduct a stable communication as the walls increase.

In the above-described IEEE802.11ad of the 60 GHz band, while the possible communication distance is as short as about 10 m, a large capacity and high-speed communication may be conducted. Although IEEE802.11ad of the 60 GHz may not pass over a blocking object due to the strong straight traveling property, the transmission and reception characteristic may be improved by adopting the directivity control by multiple antennas. As described above, since merits and demerits exist depending on the transmission methods, it is effective to switch a transmission method even during a communication.

In addition, it may be effective to switch a channel even during a communication.

The range of frequencies that may be used in a wireless communication is fixed. A frequency band to be used is divided into "channels" within the range such that multiple communication devices may conduct communications simultaneously using different channels.

In IEEE802.11b/g/n using the 2.4 GHz band, the frequency band is divided into 13 channels of 1 ch to 13 ch each having the channel width of 20 MHz.

In IEEE802.11a/n/ac using the 5 GHz band, the frequency band is divided into 19 channels of 36 ch to 64 ch and 100 ch to 140 ch each having the channel width of 20/40 MHz and 80/160 MHz.

In IEEE802.11ad using the 60 GHz band, the frequency band is divided into four channels of 1 ch to 4 ch each having the channel width of 9 GHz.

As illustrated in the example of FIG. 4A, in IEEE802.11b/g/n using the 2.4 GHz band, for example, 1 ch has the center frequency of 2,412 MHz and the band of 2,401 MHz to 2,423 MHz, 2 ch has the center frequency of 2,417 MHz and the band of 2,406 MHz to 2,428 MHz, 3 ch has the center frequency of 2,422 MHz and the band of 2,411 MHz to 2,433 MHz, 4 ch has the center frequency of 2,417 MHz and the band of 2,416 MHz to 2,438 MHz, 5 ch has the center frequency of 2,432 MHz and the band of 2,421 MHz to 2,443 MHz, 6 ch has the center frequency of 2,437 MHz and the band of 2,426 MHz to 2,448 MHz, 7 ch has the center frequency of 2,442 MHz and the band of 2,431 MHz to 2,453 MHz, 8 ch has the center frequency of 2,447 MHz and the band of 2,436 MHz to 2,458 MHz, 9 ch has the center frequency of 2,452 MHz and the band of 2,441 MHz to 2,463 MHz, 10 ch has the center frequency of 2,457 MHz and the band of 2,446 MHz to 2,468 MHz, 11 ch has the center frequency of 2,462 MHz and the band of 2,451 MHz to 2,473 MHz, 12 ch has the center frequency of 2,467 MHz and the band of 2,456 MHz to 2,478 MHz, 13 ch has the center frequency of 2,472 MHz and the band of 2,461 MHz to 2,483 MHz, 14 ch has the center frequency of 2,484 MHz and the band of 2,473 MHz to 2,495 MHz.

As described above, the frequency band of a channel overlaps with the frequency band of an adjacent channel. This is called an "overlap." Specifically, in a case of the "channel width of 20 MHz," three channels overlap with each other in the front and rear portions. In a case of the "channel width of 22 MHz," four channels overlap with each other in the front and rear portions. These channels are in the mutually interfering relationship.

That is, when one unit uses "1 ch" and another unit uses "2 ch" in a wireless communication, the channels interfere with each other. As a result, the communication may become unstable.

In a case where three (or four) channels overlap with each other, shifting the channels by the number of overlapping channels+1 avoids interference between the channels. If "1 ch, 5 ch, 9 ch, and 13 ch" are used in the case of the "channel width of 20 MHz," and "1 ch, 6 ch, 11 ch (2 ch, 7 ch, and 12 ch or 3 ch, 8 ch, and 13 ch)" are used in the case of the "channel width of 22 MHz," the communication becomes stable. Thus, the channels that may be expected to conduct a stable communication (non-overlapping channels) are the four (or three) channels.

As illustrated in the example of FIG. 4B, in IEEE802.11a/n/ac using the 5 GHz band, 19 channels are present. The frequency bands of the respective channels are independent and do not interfere with each other. That is, the interference does not occur even if an adjacent channel is allocated. Thus, if the 5 GHz band is used, not only the interference with other devices disappears but also the interference with the channels disappears.

In addition, as the switching of a channel, a "channel bonding" function (a high speed mode) may be included. That is, as the switching of a channel, added are switching of a wireless communication which does not use the channel bonding function to a wireless communication which uses the channel bonding function, switching of a wireless communication which uses the channel bonding function to a wireless communication which does not use the channel bonding function and switching between wireless communications that use the channel bonding function. The channel bonding function is a technique of using two channels simultaneously and bonding the channels to each other so as to increase the communication speed. For example, the band occupied by one channel is 20 MHz. If the bands of two channels are bonded to each other, a communication is conducted in the 40 MHz band. It should be noted that if the channel bonding function is used, the number of available channels decreases, and the interference may easily occur. Further, a master device and an associated device are required to conform to the channel bonding function.

In addition, as the switching of a transmission method, "multiple input, multiple output (MIMO)" may be included. That is, as the switching of a transmission method, added are changing of a wireless communication which does not use the MIMO to a wireless communication which uses the MIMO, changing of a wireless communication which uses the MIMO to a wireless communication which does not use the MIMO, and changing between antennas according to the MIMO The MIMO is a technique in which both a transmitter and a receiver use multiple antennas in a wireless communication so as to implement a high speed communication. In addition, a master device and an associated device are required to conform to the MIMO.

Figure 5:
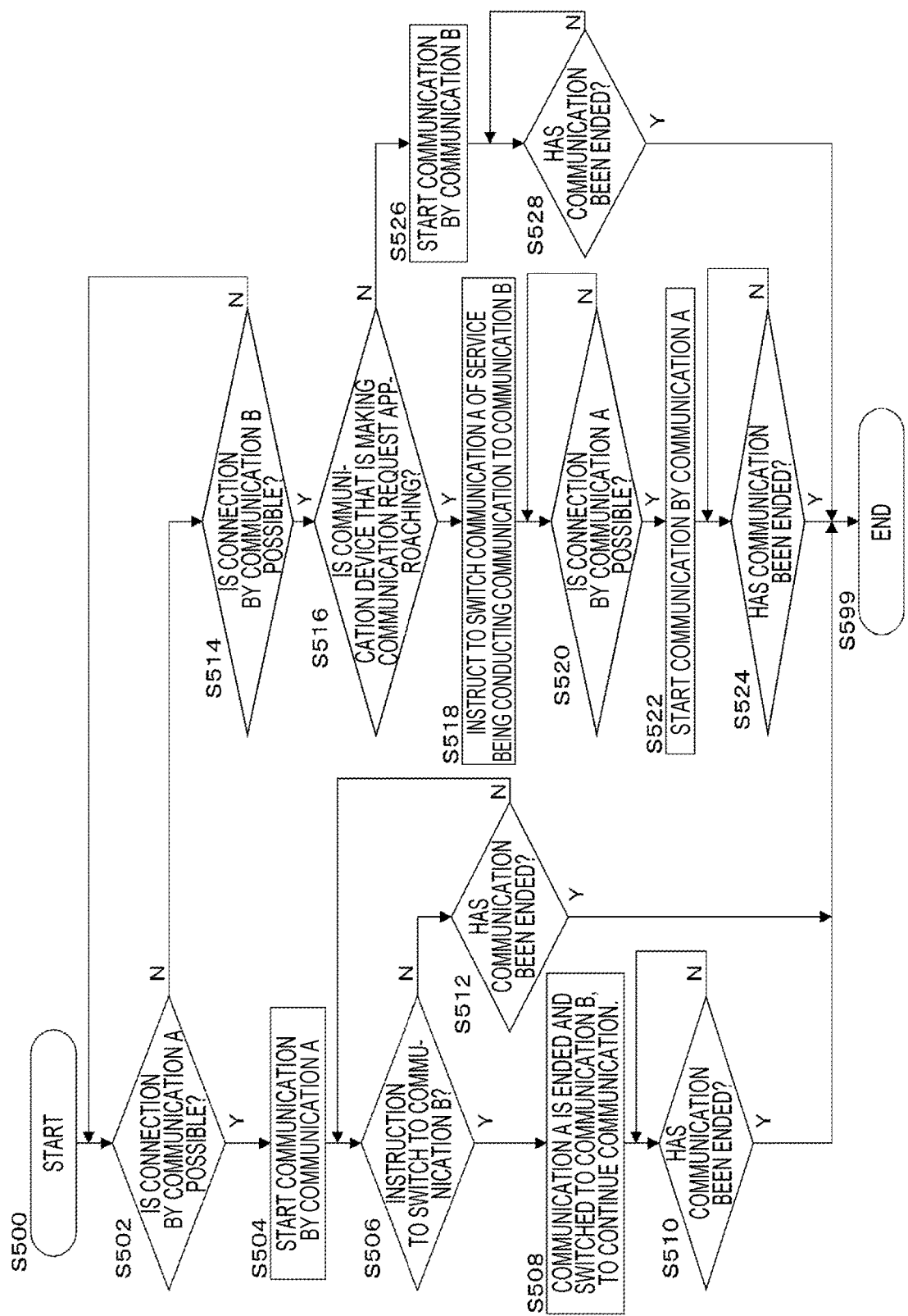
FIG. 5 is a flowchart illustrating an exemplary process by the exemplary embodiment.

FIG. 5 is a flowchart illustrating an exemplary process by the present exemplary embodiment.

Hereinafter, in the descriptions of the flowchart, for example, a communication A indicating a transmission method is the WiGig communication, and a communication B indicating a transmission method is another Wi-Fi communication.

In step S502, it is determined whether a connection by the communication A is possible. If it is determined that the connection by the communication A is possible, the process proceeds to step S504. Otherwise (for example, when the communication A has already been used), the process proceeds to step S514.

In step S504, a communication is started by the communication A.

In step S506, it is determined whether an instruction to switch the communication A to the communication B has been made. If it is determined that the instruction has been made, the process proceeds to step S508. Otherwise, the process proceeds to step S512.

In step S508, the communication A is ended and switched to the communication B, and the communication is continued.

In step S510, it is determined whether the communication has been ended. If it is determined that the communication has been ended, the process is ended (step S599). Otherwise, the process stands by until the communication is ended.

In step S512, it is determined whether the communication has been ended. If it is determined that the communication has been ended, the process is ended (step S599). Otherwise, the process returns to step S506.

In step S514, it is determined whether a connection by the communication B is possible. If it is determined that a connection by the communication B is possible, the process proceeds to step S516. Otherwise, the process returns to step S502.

In step S516, it is determined whether the communication device 180 that is making a request for start of a communication is approaching. If it is determined that the communication device 180 is approaching, the process proceeds to step S518. Otherwise, the process proceeds to step S526.

In step S518, an instruction is made to switch the communication A of the service that is conducting the communication, to the communication B. The instruction in step S518 corresponds to the instruction received in step S506.

In step S520, it is determined whether a connection by the communication A is possible. If it is determined that a connection by the communication A is possible, the process proceeds to step S522. Otherwise, the process stands by until the connection becomes possible.

In step S522, a communication is started by the communication A.

In step S524, it is determined whether the communication has been ended. If it is determined that the communication has been ended, the process is ended (step S599). Otherwise, the process stands by until the communication is ended.

In step S526, a communication is started by the communication B.

In step S528, it is determined whether the communication has been ended. If it is determined that the communication has been ended, the process is ended (step S599). Otherwise, the process stands by until the communication is ended.

The image processing apparatus 200 is equipped with the wireless communication A module 135A having the fast communication speed (the communication A in the flowchart, for example, WiGig) and the wireless communication B module 135B having the slow communication speed (the communication B in the flowchart, for example, Wi-Fi slower than WiGig).

An execution of a service is instructed by the communication device 180. Prior to the execution of the service (for example, from two seconds before the execution to immediately before the execution), it is detected whether the communication device 180 instructing the execution of the service is approaching or is moving away from the image processing apparatus 200 that is to execute the service, by using the distance between the image processing apparatus 200 and the communication device 180. If the communication device 180 is approaching, the wireless communication module 135 having the fast communication speed is selected and the communication is started. In addition, if the communication device 180 is approaching, the wireless communication module 135 may be selected in accordance with whether the type of the instructed service is a predetermined type of a service, and then the communication may be started. For example, if the communication device 180 is approaching and if the instructed service is a printing process service, the wireless communication module 135 having the fast communication speed (for example, WiGig) may be selected and the communication may be started. If the communication device 180 is approaching and if the instructed service is an image reading process service, the wireless communication module 135 having the slow communication speed (for example, other Wi-Fi) may be selected and the communication may be started. Specifically, if printing of a document is instructed to the image processing apparatus 200 from the communication device 180, document data to be printed is sent to the image processing apparatus 200 for execution of a print job. If the communication device 180 is approaching the image processing apparatus 200, the document data is quickly sent to the image processing apparatus 200 by using the wireless communication module 135 having the fast communication speed (for example, WiGig). With this configuration, the user arriving at the image processing apparatus 200 obtains the printed document without waiting, or the waiting time is reduced.

It is detected whether the communication device 180 is approaching or is moving away from the image processing apparatus 200 that is to execute the service. If the communication device 180 is moving away or if the distance does not change (the communication device 180 is stopping), the wireless communication module 135 may be determined by a determination method of the related art.

In addition, if the image reading process service for sending the document image scanned by the image processing apparatus 200 to the communication device 180 is instructed, if it is measured whether the communication device 180 is leaving the image processing apparatus 200 prior to sending the document image to the communication device 180 after the scanning is ended, and if the communication device 180 is leaving, it is unnecessary to see the document image that reaches the communication device 180 at the place of the image processing apparatus 200 (in front of the image processing apparatus 200). Thus, the wireless communication module 135 having the slow communication speed (for example, other Wi-Fi) may be used to send the document image to the communication device 180, and the wireless communication module 135 having the fast communication speed (for example, WiGig) may be brought into a usable state.

Figure 6:
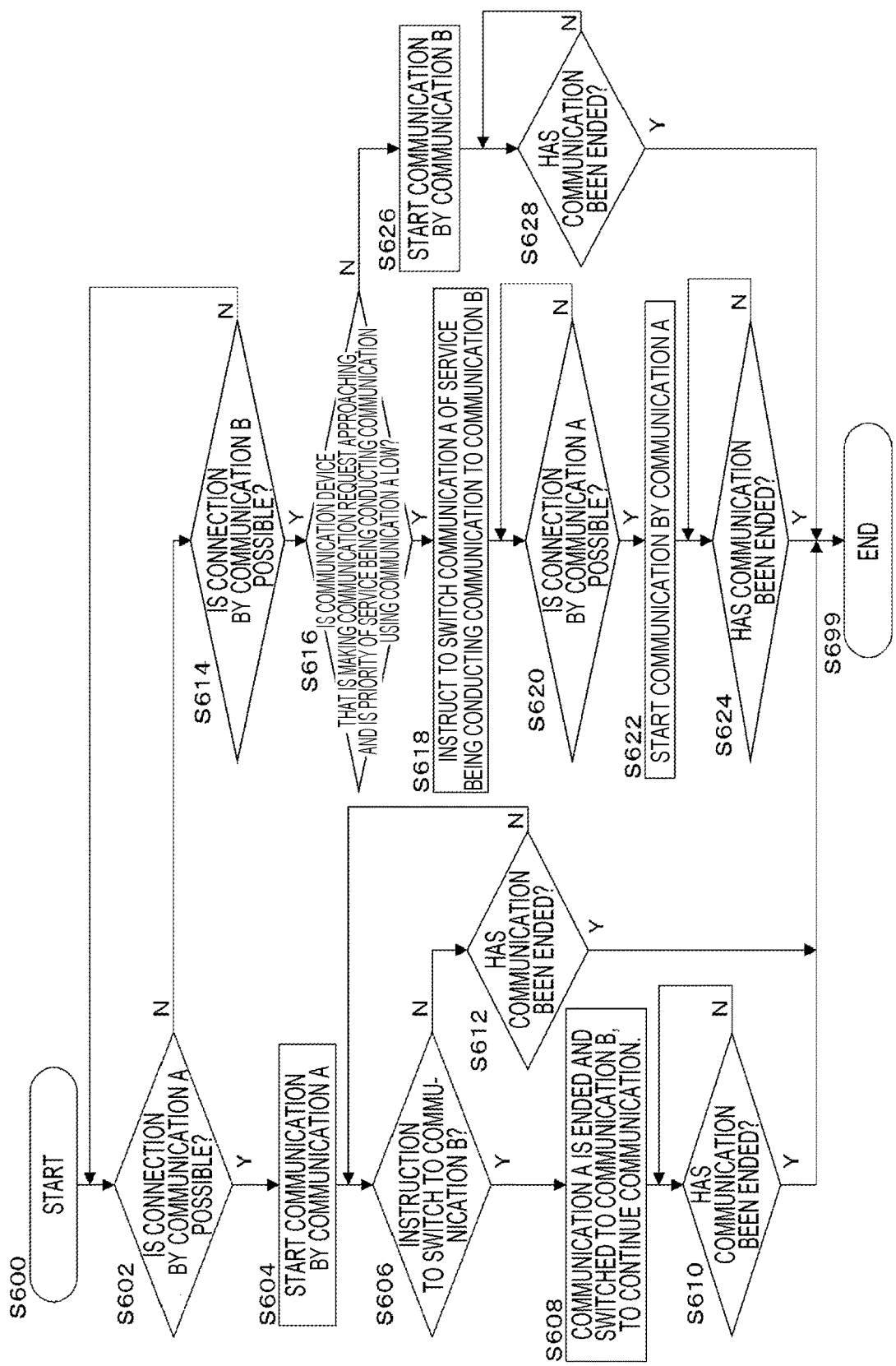
FIG. 6 is a flowchart illustrating an exemplary process by the exemplary embodiment.

FIG. 6 is a flowchart illustrating an exemplary process by the present exemplary embodiment.

In step S602, it is determined whether a connection by the communication A is possible. If it is determined that a connection by the communication A is possible, the process proceeds to step S604. Otherwise (for example, when the communication A has already been used), the process proceeds to step S614.

In step S604, a communication is started by the communication A.

In step S606, it is determined whether an instruction to switch the communication A to the communication B has been made. If it is determined that the instruction has been made, the process proceeds to step S608. Otherwise, the process proceeds to step S612.

In step S608, the communication A is ended and switched to the communication B, and the communication is continued.

In step S610, it is determined whether the communication has been ended. If it is determined that the communication has been ended, the process is ended (step S699). Otherwise, the process stands by until the communication is ended.

In step S612, it is determined whether the communication has been ended. If it is determined that the communication has been ended, the process is ended (step S699). Otherwise, the process returns to step S606.

In step S614, it is determined whether a connection by the communication B is possible. If it is determined that a connection by the communication B is possible, the process proceeds to step S616. Otherwise, the process returns to step S602.

In step S616, it is determined whether the communication device 180 that is making a request for start of a communication is approaching and whether the priority of the service that is conducting the communication using the communication A is low. If it is determined that the communication device 180 that is making the request for start of the communication is approaching and that the priority of the service that is conducting the communication using the communication A is low, the process proceeds to step S618. Otherwise, the process proceeds to step S626.

For example, the priority of the printing process service is higher than the priority of the image reading process service. Thus, if the service from the communication device 180 that is making the request for start of the communication is the printing process service and if the service that is conducting the communication using the communication A is the image reading process service, the process proceeds to step S618 for performing the switching process.

In step S618, an instruction is made to switch the communication A of the service that is conducting the communication, to the communication B. The instruction in step S618 corresponds to the instruction received in step S606.

In step S620, it is determined whether a connection by the communication A is possible. If it is determined that a connection by the communication A is possible, the process proceeds to step S622. Otherwise, the process stands by until the connection becomes possible.

In step S622, a communication is started by the communication A.

In step S624, it is determined whether the communication has been ended. If it is determined that the communication has been ended, the process is ended (step S699). Otherwise, the process stands by until the communication is ended.

In step S626, a communication is started by the communication B.

In step S628, it is determined whether the communication has been ended. If it is determined that the communication has been ended, the process is ended (step S699). Otherwise, the process stands by until the communication is ended.

Figure 7:
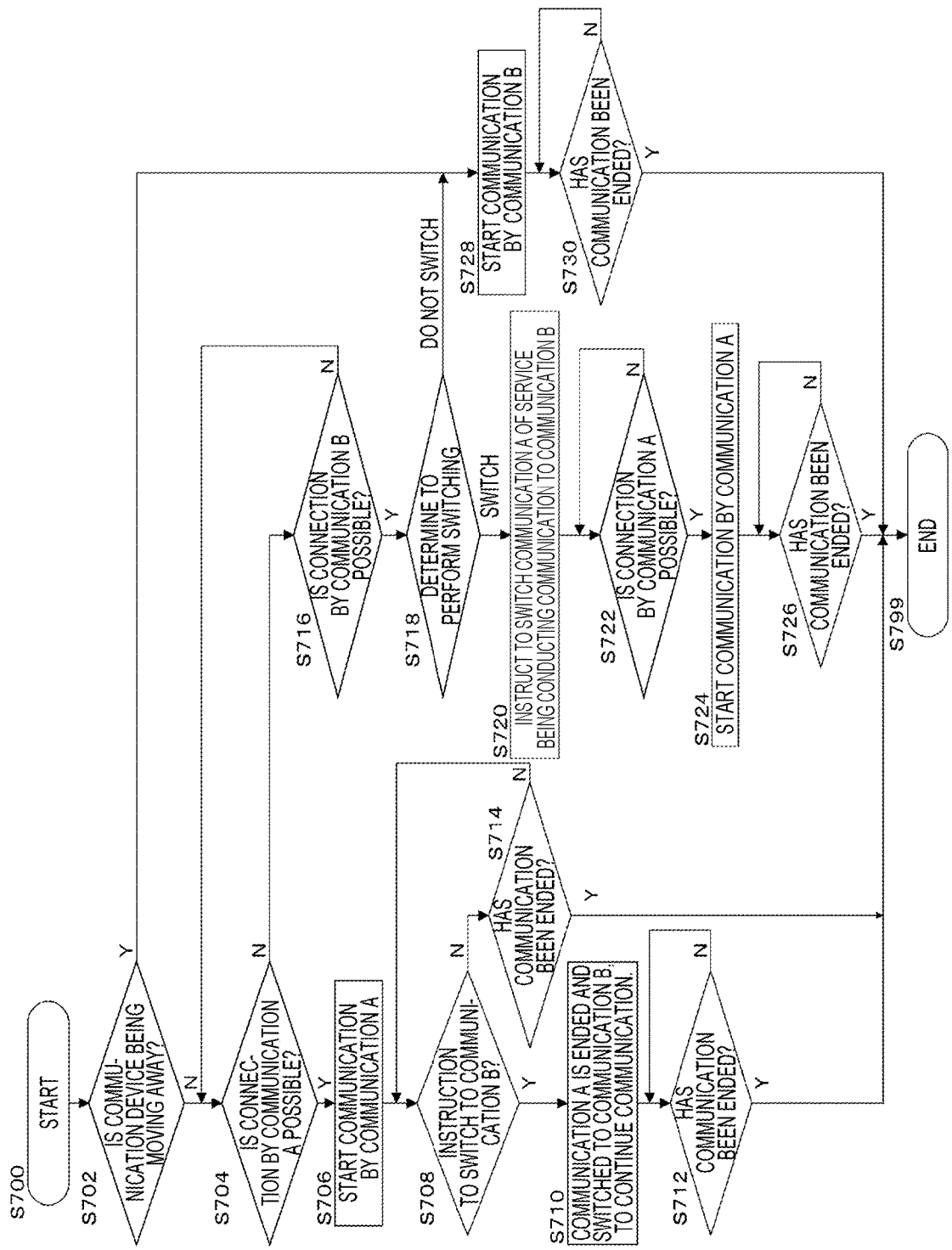
FIG. 7 is a flowchart illustrating an exemplary process by the exemplary embodiment.

FIG. 7 is a flowchart illustrating an exemplary process by the present exemplary embodiment.

In step S702, it is determined whether the communication device 180 is moving away. If it is determined that the communication device 180 is moving away, the process proceeds to step S728. Otherwise, the process proceeds to step S704. That is, it is detected whether the communication device 180 is approaching or is moving away from the image processing apparatus 200 that is to execute the service. If the communication device 180 is moving away, the process proceeds to step S728 for selecting the wireless communication module 135 having a low directivity (for example, other Wi-Fi), rather than selecting the wireless communication module 135 having the highest directivity (for example, WiGig) among the wireless communication modules 135. The case where the communication device 180 is moving away indicates that the communication device 180 is highly likely to be out of a communication range of the wireless communication module 135 having the highest directivity among the wireless communication modules 135, rather than indicating that the communication device 180 is linearly moving away. Thus, if the communication device 180 is moving away, the wireless communication module 135 having the low directivity is selected.

In step S704, it is determined whether a connection by the communication A is possible. If it is determined that a connection by the communication A is possible, the process proceeds to step S706. Otherwise (for example, when the communication A has already been used), the process proceeds to step S716.

In step S706, communication is started using the communication A.

In step S708, it is determined whether an instruction to switch the communication A to the communication B has been made. If it is determined that the instruction has been made, the process proceeds to step S710. Otherwise, the process proceeds to step S714.

In step S710, the communication A is ended and switched to the communication B, and the communication is continued.

In step S712, it is determined whether the communication has been ended. If it is determined that the communication has been ended, the process is ended (step S799). Otherwise, the process stands by until the communication is ended.

In step S714, it is determined whether the communication has been ended. If it is determined that the communication has been ended, the process is ended (step S799). Otherwise, the process returns to step S708.

In step S716, it is determined whether a connection by the communication B is possible. If it is determined that a connection by the communication B is possible, the process proceeds to step S718. Otherwise, the process returns to step S704.

In step S718, it is determined whether to perform the switching. If it is determined to perform the switching, the process proceeds to step S720. If it is determined not to perform the switching, the process proceeds to step S728. For example, the determination process in step S516 illustrated in FIG. 5 or the determination process in S616 illustrated in FIG. 6 may be performed.

In step S720, an instruction is made to switch the communication A of the service being in communication, to the communication B. The instruction in step S720 corresponds to the instruction received in step S708.

In step S722, it is determined whether a connection by the communication A is possible. If it is determined that a connection by the communication A is possible, the process proceeds to step S724. Otherwise, the process stands by until the connection becomes possible.

In step S724, communication is started using the communication A.

In step S726, it is determined whether the communication has been ended. If it is determined that the communication has been ended, the process is ended (step S799). Otherwise, the process stands by until the communication is ended.

In step S728, communication is started using the communication B.

In step S730, it is determined whether the communication has been ended. If it is determined that the communication has been ended, the process is ended (step S799). Otherwise, the process stands by until the communication is ended.

Figure 8:
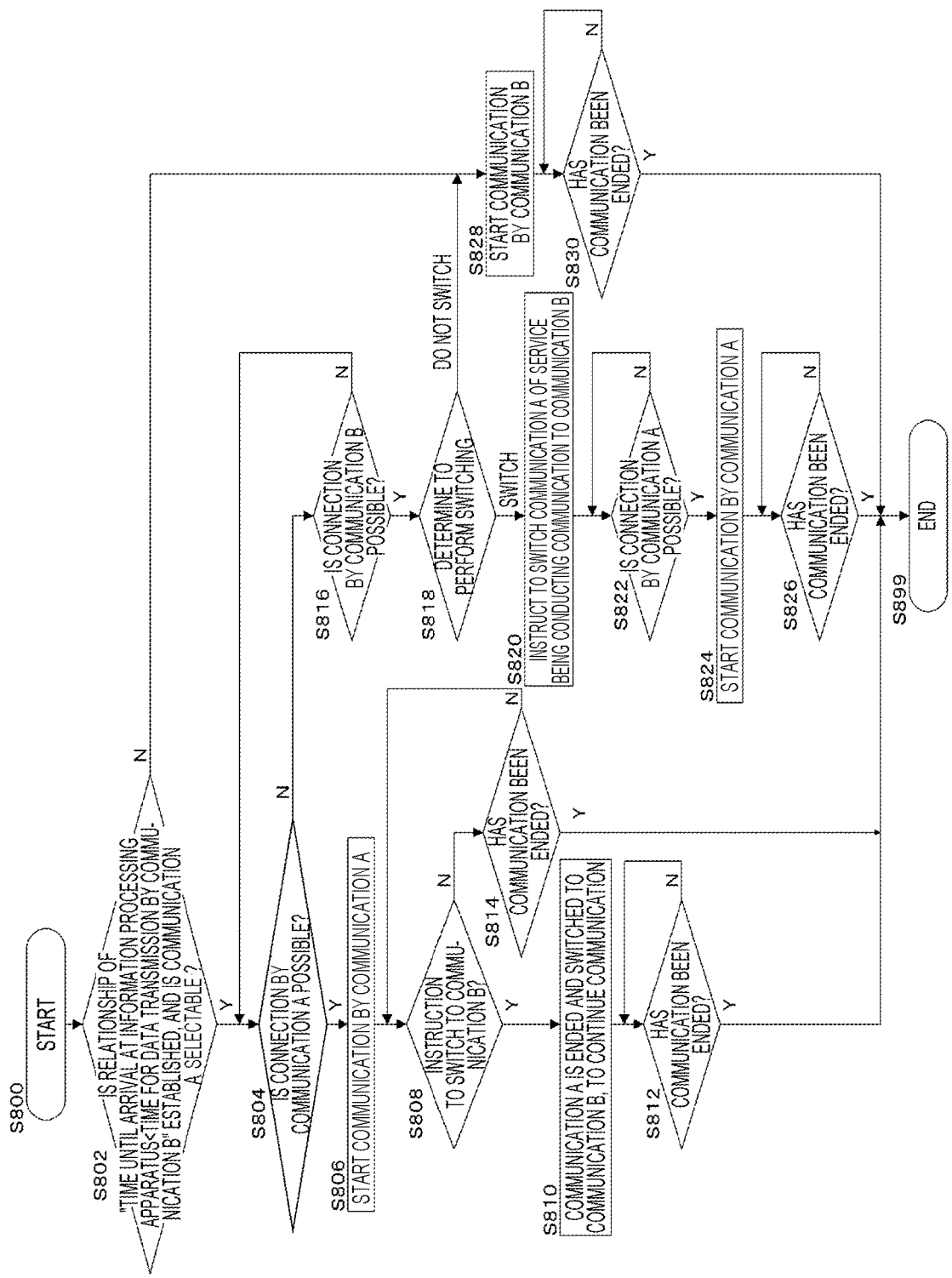
FIG. 8 is a flowchart illustrating an exemplary process by the exemplary embodiment.

FIG. 8 is a flowchart illustrating an exemplary process by the present exemplary embodiment.

In step S802, it is determined (i) whether a relationship of "a time until arrival at the information processing apparatus 100 (calculated from a distance and a speed)<a time for data transfer by the communication B (calculated from a data amount and a communication speed of the communication B)" is established and (ii) whether the communication A is selectable. If it is determined that the relationship of "a time until arrival at the information processing apparatus 100<a time for data transfer by the communication B" is established and that the communication A is selectable, the process proceeds to step S804. Otherwise, the process proceeds to step S828. Alternatively, if it is determined that the relationship of "a time until arrival at the information processing apparatus 100 (calculated from a distance and a speed)<a time for data transfer by the communication B (calculated from a data amount and a communication speed of the communication B)" is established, the process may proceed to step S804. Otherwise, the process may proceed to step S828.

That is, in the process of step S802, if the user is approaching the image processing apparatus 200, the time until the user arrives at the image processing apparatus 200 is calculated. Based on the data amount to be transmitted and the communication speed, the wireless communication module 135 capable of completing the transmission until the user arrives at the image processing apparatus 200 is selected. For example, if the data amount is small and if even the wireless communication module 135 having the slow communication speed completes transmission of all of the data before the user arrives at the image processing apparatus 200, the wireless communication module 135 having the slow communication speed is used. With this configuration, the wireless communication module 135 having the fast communication speed is brought into the usable state.

Alternatively, rather than the time, the distance between the user (the communication device 180) and the image processing apparatus 200 may be used for the determination. If the distance is equal to or larger than a predetermined threshold (for example, the distance of 10 m or more), the wireless communication module 135 having the slow communication speed may be used. If the distance is less than the threshold, the wireless communication module 135 having the fast communication speed may be used. This determination uses fewer elements than those in calculating the time. Unlike the calculation only by software, calculating the time requires measuring the speed. If the approaching speed is measured by a sensor or the like, costs will increase.

In step S804, it is determined whether a connection by the communication A is possible. If it is determined that a connection by the communication A is possible, the process proceeds to step S806. Otherwise (for example, when the communication A has already been used), the process proceeds to step S816.

In step S806, communication is started using the communication A.

In step S808, it is determined whether an instruction to switch the communication A to the communication B has been made. If it is determined that the instruction has been made, the process proceeds to step S810. Otherwise, the process proceeds to step S814.

In step S810, the communication A is ended and switched to the communication B, and the communication is continued.

In step S812, it is determined whether the communication has been ended. If it is determined that the communication has been ended, the process is ended (step S899). Otherwise, the process stands by until the communication is ended.

In step S814, it is determined whether the communication has been ended. If it is determined that the communication has been ended, the process is ended (step S899). Otherwise, the process returns to step S808.

In step S816, it is determined whether a connection by the communication B is possible. If it is determined that a connection by the communication B is possible, the process proceeds to step S818. Otherwise, the process returns to step S804.

In step S818, it is determined whether to perform the switching. If it is determined to perform the switching, the process proceeds to step S820. If it is determined not to perform the switching, the process proceeds to step S828. For example, the determination process in step S516 illustrated in FIG. 5 or the determination process in S616 illustrated in FIG. 6 may be performed.

In step S820, an instruction is made to switch the communication A of the service that is conducting the communication, to the communication B. The instruction in step S820 corresponds to the instruction received in step S808.

In step S822, it is determined whether a connection by the communication A is possible. If it is determined that a connection by the communication A is possible, the process proceeds to step S824. Otherwise, the process stands by until the connection becomes possible.

In step S824, communication is started using the communication A.

In step S826, it is determined whether the communication has been ended. If it is determined that the communication has been ended, the process is ended (step S899). Otherwise, the process stands by until the communication is ended.

In step S828, communication is started using the communication B.

In step S830, it is determined whether the communication has been ended. If it is determined that the communication has been ended, the process is ended (step S899). Otherwise, the process stands by until the communication is ended.

Figure 9:
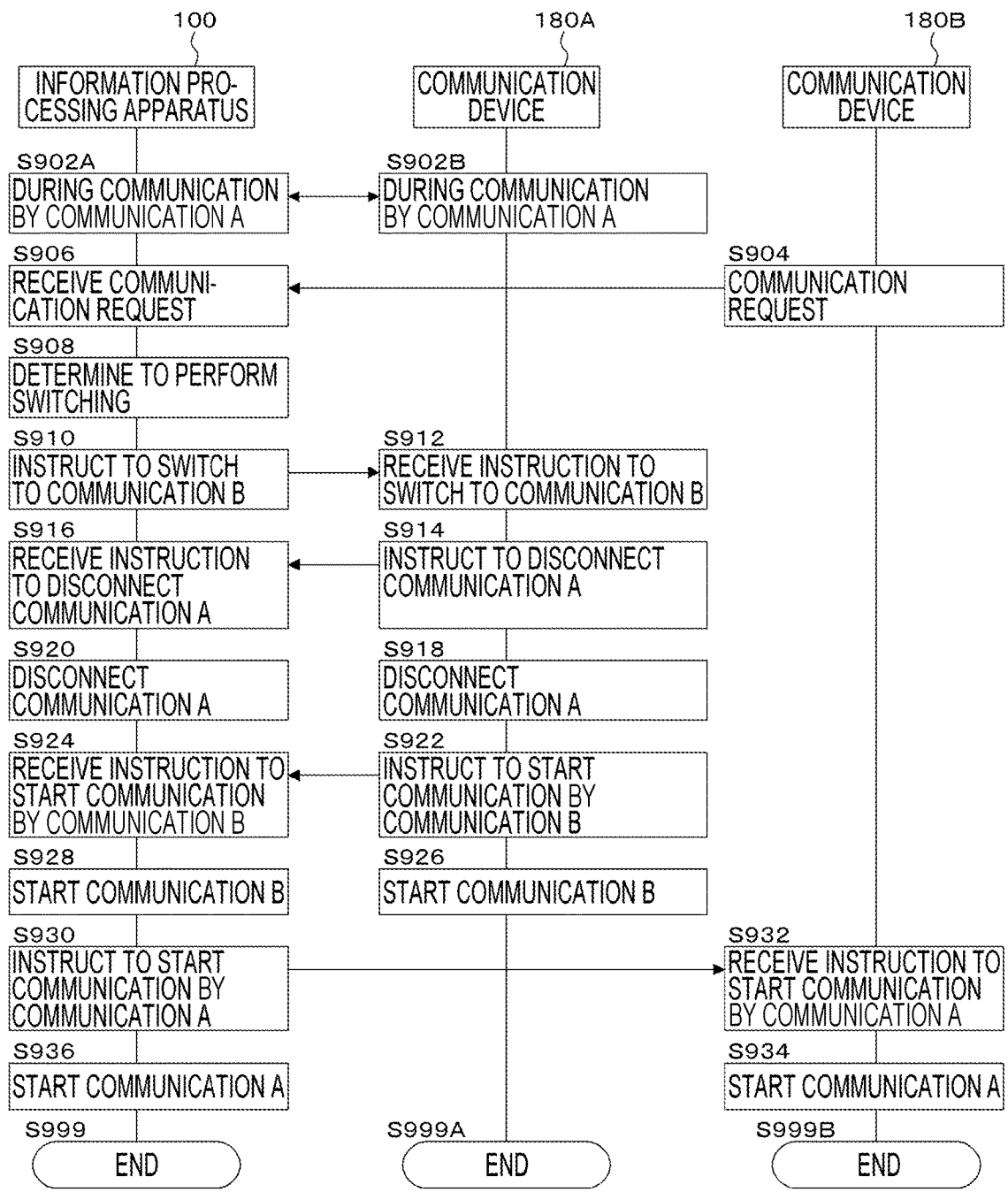
FIG. 9 is a flowchart illustrating an exemplary process by the exemplary embodiment.

FIG. 9 is a flowchart illustrating an exemplary process by the present exemplary embodiment. FIG. 9 illustrates the exemplary process in a case where the switching occurs, among the exemplary processes in the flowcharts illustrated in FIGS. 5 to 8. FIG. 9 represents an example where when the communication device 180A and the information processing apparatus 100 have already communicated with each other by using the communication A having the fast communication speed (for example, the WiGig communication), a communication request is made from the communication device 180B, it is determined that the switching of the communication channels is necessary, the communication with the communication device 180A is switched to a communication B having the slow communication speed (for example, other Wi-Fi communication), and the communication with the communication device 180B is conducted by using the communication A having the fast communication speed.

In step S902A, the information processing apparatus 100 and the communication device 180A are communicating with each other using the communication A.

In step S902B, the communication device 180A and the information processing apparatus 100 are communicating with each other using the communication A.

In step S904, the communication device 180B transmits a communication request to the information processing apparatus 100.

In step S906, the information processing apparatus 100 receives the communication request from the communication device 180B.

In step S908, the information processing apparatus 100 determines to perform the switching.

In step S910, the information processing apparatus 100 transmits an instruction to switch the communication A to the communication B, to the communication device 180A.

In step S912, the communication device 180A receives the instruction to switch the communication A to the communication B, from the information processing apparatus 100.

In step S914, the communication device 180A transmits an instruction to disconnect the communication A, to the information processing apparatus 100.

In step S916, the information processing apparatus 100 receives the instruction to disconnect the communication A, from the communication device 180A.

In step S918, the communication device 180A disconnects the communication A.

In step S920, the information processing apparatus 100 disconnects the communication A.

In step S922, the communication device 180A transmits an instruction to start a communication using the communication B, to the information processing apparatus 100.

In step S924, the information processing apparatus 100 receives the instruction to start a communication using the communication B, from the communication device 180A.

In steps S914 and S922, the instructions are transmitted from the communication device 180A to the information processing apparatus 100. Alternatively, in reverse, the instructions may be transmitted from the information processing apparatus 100 to the communication device 180A.

In step S926, the communication device 180A starts the communication B.

In step S928, the information processing apparatus 100 starts the communication B.

In step S930, the information processing apparatus 100 transmits an instruction to start a communication using the communication A, to the communication device 180B.

In step S932, the communication device 180B receives the instruction to start a communication using the communication A, from the information processing apparatus 100.

In step S934, the communication device 180B starts the communication A.

In step S936, the information processing apparatus 100 starts the communication A.

Figure 10:
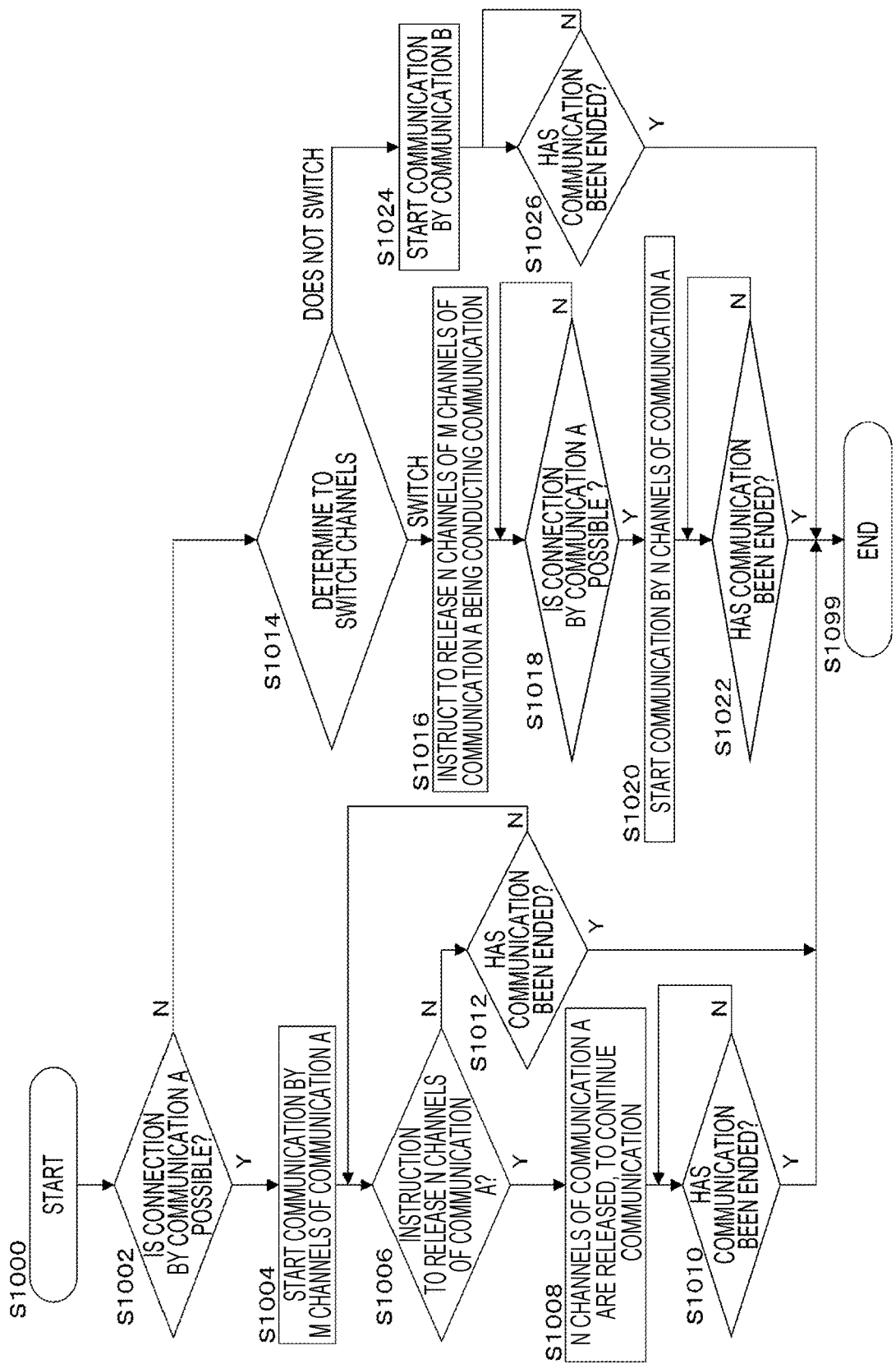
FIG. 10 is a flowchart illustrating an exemplary process by the exemplary embodiment.

FIG. 10 is a flowchart illustrating an exemplary process by the present exemplary embodiment.

In the flowchart of FIG. 10, M channels refer to the number of channels that may be used by the communication A at the same time (the number of channels used by the channel bonding). When the communication A is WiGig, the M channels are, for example, "four channels." N channels refer to the number of channels that is smaller than the M channels. N channels are, for example, "two channels." For example, if all of the four channels of the wireless communication module 135 (WiGig) having the fast communication speed are used, the four channels are reduced to two channels, and the reduced two channels are allocated to the wireless communication module 135 that is attempting to newly start a communication, and the communication is conducted.

In step S1002, it is determined whether a connection by the communication A is possible. If it is determined that a connection by the communication A is possible, the process proceeds to step S1004. Otherwise (for example, when the communication A has already been used), the process proceeds to step S1014.

In step S1004, communication is started using the M channels of the communication A.

In step S1006, it is determined whether an instruction to release the N channels of the communication A has been made. If it is determined that the instruction has been made, the process proceeds to step S1008. Otherwise, the process proceeds to step S1012.

In step S1008, the N channels of the communication A are released, and the communication is continued.

In step S1010, it is determined whether the communication has been ended. If it is determined that the communication has been ended, the process is ended (step S1099). Otherwise, the process stands by until the communication is ended.

In step S1012, it is determined whether the communication has been ended. If it is determined that the communication has been ended, the process is ended (step S1099). Otherwise, the process returns to step S1006.

In step S1014, it is determined whether to switch the channels. If it is determined to switch the channels, the process proceeds to step S1016. If it is determined not to switch the channels, the process proceeds to step S1024. For example, the determination process in step S516 illustrated in FIG. 5 or the determination process in S616 illustrated in FIG. 6 may be performed. For example, when a communication is started first with the image reading process service and when the approaching communication device 180 is attempting to start the printing process service during the communication, it is determined to "switch" in step S1014. In addition, rather than comparing the priority of the service, a determination may be made based on a comparison between the remaining data amount of the service that is conducting the communication and the data amount of the service that is attempting to start the communication. Alternatively, a determination may be made based on a comparison between the remaining communication time of the service that is conducting the communication and the communication time of the service that is attempting to start the communication.

In step S1016, an instruction is made to release the N channels of the M channels of the communication A that is conducting the communication. The instruction in step S1016 corresponds to the instruction received in step S1006.

In step S1018, it is determined whether a connection by the communication A is possible. If it is determined that a connection by the communication A is possible, the process proceeds to step S1020. Otherwise, the process stands by until the connection becomes possible.

In step S1020, communication is started using the N channels of the communication A.

In step S1022, it is determined whether the communication has been ended. If it is determined that the communication has been ended, the process is ended (step S1099). Otherwise, the process stands by until the communication is ended.

In step S1024, communication is started using the communication B. In this example, the communication is conducted with the communication B. Alternatively, the communication stands by until the communication A becomes free.

In step S1026, it is determined whether the communication has been ended. If it is determined that the communication has been ended, the process is ended (step S1099). Otherwise, the process stands by until the communication is ended.

Figure 11:
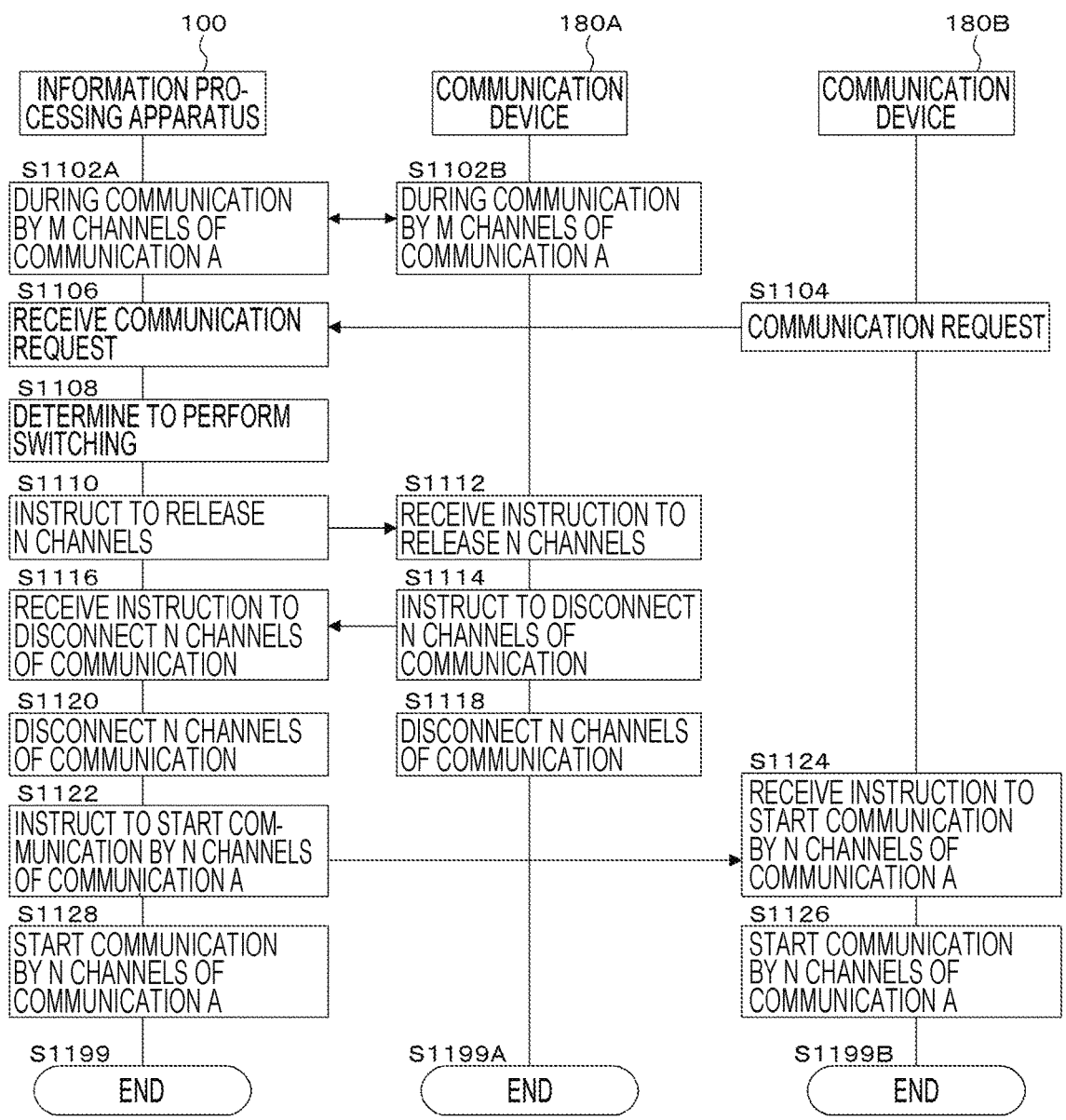
FIG. 11 is a flowchart illustrating an exemplary process by the exemplary embodiment.

FIG. 11 is a flowchart illustrating an exemplary process by the present exemplary embodiment. FIG. 11 represents an exemplary process in a case where the switching of the number of the channels occurs, in the exemplary process of the flowchart illustrated in FIG. 10. FIG. 10 represents an example where when the communication device 180A and the information processing apparatus 100 have already communicated with each other by using the M channels of the communication A having the fast communication speed (for example, the WiGig communication), a communication request is made from the communication device 180B, it is determined that the switching of the communication channels is necessary, the communication with the communication device 180A is switched to a communication by (M-N) channels, and the communication with the communication device 180B is conducted by using the N channels of the communication A.

In step S1102A, the information processing apparatus 100 and the communication device 180A are communicating with each other using the M channels of the communication A.

In step S1102B, the communication device 180A and the information processing apparatus 100 are communicating with each other using the M channels of the communication A.

In step S1104, the communication device 180B transmits a communication request to the information processing apparatus 100.

In step S1106, the information processing apparatus 100 receives the communication request from the communication device 180B.

In step S1108, the information processing apparatus 100 determines whether to switch the channels.

In step S1110, the information processing apparatus 100 transmits an instruction to release the N channels, to the communication device 180A.

In step S1112, the communication device 180A receives the instruction to release the N channels, from the information processing apparatus 100.

In step S1114, the communication device 180A transmits an instruction to disconnect the N channels of the communication, to the information processing apparatus 100.

In step S1114, the instruction is transmitted from the communication device 180A to the information processing apparatus 100. Alternatively, in reverse, the instruction may be transmitted from the information processing apparatus 100 to the communication device 180A.

In step S1116, the information processing apparatus 100 receives the instruction to disconnect the N channels of the communication, from the communication device 180A.

In step S1118, the communication device 180A disconnects the N channels of the communication.

In step S1120, the information processing apparatus 100 disconnects the N channels of the communication.

In step S1122, the information processing apparatus 100 transmits an instruction to start a communication using the N channels of the communication A, to the communication device 180B.

In step S1124, the communication device 180B receives the instruction to start a communication using the N channels of the communication A, from the information processing apparatus 100.

In step S1126, the communication device 180B starts the communication using the N channels of the communication A.

In step S1128, the information processing apparatus 100 starts the communication using the N channels of the communication A.

Figure 12:
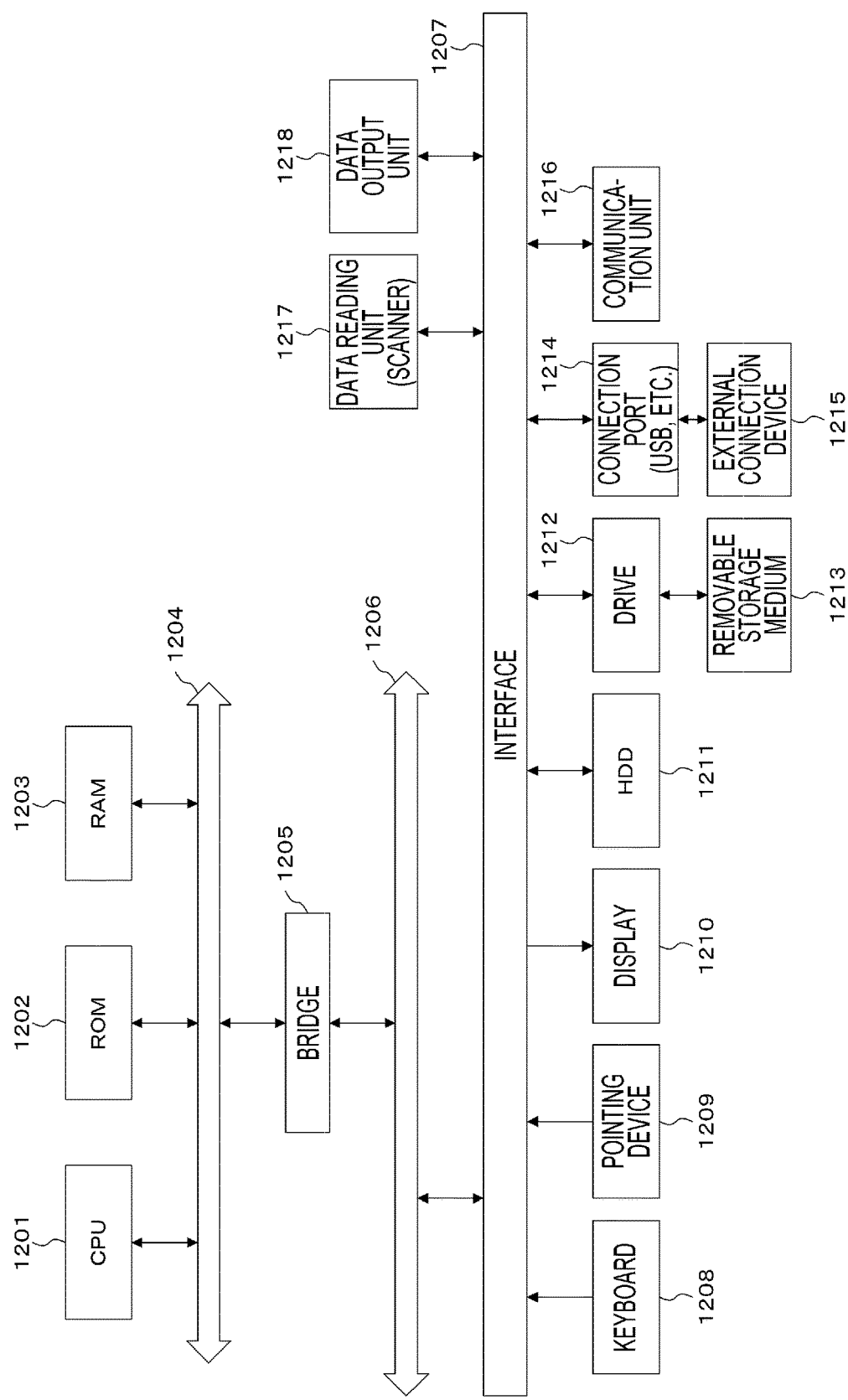
FIG. 12 is a block diagram illustrating an exemplary hardware configuration of a computer implementing the exemplary embodiment.

An exemplary hardware configuration of the information processing apparatus of the present exemplary embodiment will be described with reference to FIG. 12. The configuration illustrated in FIG. 12 is implemented with, for example, a personal computer (PC), and represents an exemplary hardware configuration provided with a data reading unit 1217 such as a scanner and a data output unit 1218 such as a printer. Further, while the example illustrated in FIG. 3 represents the configuration mainly serving as a chip using the ASIC or the like, the example illustrated in FIG. 12 mainly represents a functional configuration that is implemented with a personal computer or the like. For example, a CPU 1201 takes in charge of the functions of the SoC 300 and the ASIC 330.

The CPU 1201 is a controller that performs processes according to a computer program describing an execution sequence of each of the various modules described in the above-described exemplary embodiment, that is, the communication control module 110, the approach/moving-away detection module 115, the switching determination module 120, the switching module 125, the control module 130, the wireless communication modules 135, and the like.

A read only memory (ROM) 1202 stores programs, operation parameters and the like used by the CPU 1201. A RAM 1203 stores programs used in the execution by the CPU 1201, parameters appropriately varying in the execution, and the like. These components are connected to each other by a host bus 1204 configured with a CPU bus or the like.

The host bus 1204 is connected to an external bus 1206 such as a peripheral component interconnect/interface (PCI) bus via a bridge 1205.

A keyboard 1208 and a pointing device 1209 such as a mouse are devices operated by an operator. A display 1210 is, for example, a liquid crystal display device or a cathode ray tube (CRT), and displays various types of information as texts and image information. In addition, a touch screen or the like having the functions of both the pointing device 1209 and the display 1210 may be used. In this case, the function of the keyboard may be implemented by drawing the keyboard using software (also called a so-called software keyboard, screen keyboard or the like) on the screen (the touch screen), without the physical connection as in the keyboard 1208.

A hard disk drive (HDD) 1211 is equipped with a hard disk (which may be a flash memory or the like) therein, drives the hard disk, and stores or plays programs or information executed by the CPU 1201. In the hard disk, predetermined priorities of services, communication contents, and the like are stored. Further, in the hard disk, other various data and various computer programs are stored.

A drive 1212 reads data or programs stored in a removable storage medium 1213 such as a mounted magnetic disk, optical disc, magneto-optical disc, or semiconductor memory, and supplies the data or programs to the interface 1207, the external bus 1206, the bridge 1205, and the RAM 1203 connected via the host bus 1204. In addition, the removable storage medium 1213 may also be used as a data storing area.

A connection port 1214 is a port for connection of an external connection device 1215, and includes connection units such as USB and IEEE 1394. The connection port 1214 is connected to the CPU 1201 and the like via the interface 1207, the external bus 1206, the bridge 1205, the host bus 1204, and the like. A communication unit 1216 is connected to a communication line and performs a process of a data communication with an external device. A data reading unit 1217 is, for example, a scanner and performs a document reading process. A data output unit 1218 is, for example, a printer and performs a document data outputting process.

The hardware configuration of the information processing apparatus illustrated in FIG. 12 represents an exemplary configuration. The present exemplary embodiment is not limited to the configuration illustrated in FIG. 12, and may be any configuration that may execute the modules described in the present exemplary embodiment. For example, some of the modules may be configured with dedicated hardware (for example, application specific integrated circuit (ASIC)), and some of the modules may be in the form in which the modules are present in an external system and are connected via a communication line. Further, the multiple systems illustrated in FIG. 12 may be connected to each other via a communication line and cooperate with each other. In addition, especially, the multiple systems of FIG. 12 may be incorporated in a personal computer, a portable information communication device (including a mobile phone, a smart phone, a mobile device, a wearable computer, and the like), an information appliance, a robot, a copying machine, a facsimile, a scanner, a printer, a multi-functional machine (an image processing apparatus having two or more functions of a scanner, a printer, a copying machine, a facsimile and, the like), and the like.

In the comparing process described in the above-described exemplary embodiment, the expressions "equal to or more than," "equal to or less than," "larger than," and "smaller than (not exceeding)" may be replaced with "larger than," "smaller than (not exceeding)," "equal to or more than," and "equal to or less than," respectively unless the replacement causes contradiction.

In addition, the communication device 180 may include the information processing apparatus 100. For example, an image processing apparatus having no information processing apparatus 100 and the communication device 180 having the information processing apparatus 100 may communicate with each other. Alternatively, the image processing apparatus 200 having the information processing apparatus 100 and the communication device 180 having the information processing apparatus 100 may communicate with each other.

The above-described programs may be provided in the form of being stored in a storage medium or provided by a communication unit. In this case, for example, the above-described programs may be construed as an invention of a "computer readable storage medium storing a program."

The "computer readable storage medium storing a program" refers to a computer readable storage medium storing a program, which is used for installation, execution, distribution, and the like of a program.

The storage medium includes, for example, a digital versatile disc (DVD) such as "DVD-R, DVD-RW, DVD-RAM or the like" which is the standard formulated in the DVD forum, "DVD+R, DVD+RW or the like" which is the standard formulated in DVD+RW, a compact disc (CD) such as a CD read only memory (CD-ROM), a CD recordable (CD-R), or a CD rewritable (CD-RW), a Blu-ray disc (Blu-ray (registered trademark) disc), a magneto-optical (MO) disc, a flexible disk (FD), a magnetic tape, a hard disk, a ROM, an electrically erasable and rewritable read only memory (EEPROM (registered trademark)), a flash memory, a random access memory (RAM), and a secure digital (SD) memory card.

All or some of the above-described programs may be stored in the storage medium so as to be saved or distributed. Further, the programs may be transmitted using a transmission medium such as a wired network used in a local area network (LAN), a metropolitan area network (MAN), a wide area network (WAN), the Internet, the Intranet, the Extranet, and the like, a wireless communication network, or a combination thereof, or may be carried on carrier waves.

In addition, the above-described programs may be all or parts of other programs, or may be stored together with separate programs in the storage medium. In addition, the above-described programs may be divided and stored in multiple storage media. In addition, the above-described programs may be stored in a compressed or encrypted form as long as the programs may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a plurality of communication modules configured to conduct a wireless communication;
   a processor programmed to function as:
      a selection unit to select a communication module from among the plurality of communication modules in accordance with whether a mobile communication terminal communicating with the information processing apparatus is moving away from the information processing apparatus; and
      a controller configured to perform a control so as to start the communication using the selected communication module.

2. The information processing apparatus according to claim 1, wherein if the mobile communication terminal is moving away from the information processing apparatus, the selection unit selects the communication module having a lower communication speed than that of a communication module used before the controller performs the control to start the communication using the selected communication modules.

3. The information processing apparatus according to claim 2, wherein if the mobile communication terminal is moving away from the information processing apparatus and if the service that is attempting to conduct a communication is a predetermined service, the selection unit selects the communication module having the lower communication speed than that of a communication module used before the controller performs the control to start the communication using the selected communication modules.

4. The information processing apparatus according to claim 3, wherein the predetermined service is a printing process service.

5. The information processing apparatus according to claim 1, wherein if the mobile communication terminal is moving away from the information processing apparatus, the selection unit does not select the communication module having the highest directivity among the plurality of communication modules.

6. The information processing apparatus according to claim 2, wherein the selection unit selects the communication module by using a time until the mobile communication terminal arrives at the information processing apparatus, a communication data amount, and a communication speed.

7. The information processing apparatus according to claim 1, wherein
   the communication module includes a plurality of channels, and
   if the predetermined service is already conducting a communication using the plurality of channels, the selection unit determines to perform switching of the communication module by reducing the number of channels that the predetermined service can use and allocating the reduced channels to the service that is attempting to start a communication.

8. The information processing apparatus according to claim 7, wherein the processor is further programmed to function as a switching module configured to perform the switching determined by the selection unit by:
   instructing the another communication terminal to release the reduced channels;
   receiving an instruction from the another communication terminal to disconnect the reduced channels;
   disconnecting the reduced channels in response to the received instruction from the another communication terminal; and
   instructing the communication terminal to start communication using the reduced channels of the selected communication module.

9. The information processing apparatus according to claim 1, wherein if the predetermined service is already conducting a communication using the selected communication module, the selection unit determines to perform switching of the communication module by switching the predetermined service to conduct communication using a different communication module of the plurality of communication modules.

10. The information processing apparatus according to claim 9, wherein the processor is further programmed to function as a switching module configured to perform the switching determined by the selection unit by:
    instructing the another communication terminal to switch to the different communication module;
    receiving an instruction from the another communication terminal to disconnect from the selected communication module;
    disconnecting the another communication terminal from the selected communication module in response to the received instruction from the another communication terminal;
    receiving an instruction from the another communication terminal to connect to the different communication module;
    connecting the another communication terminal from the different communication module in response to the received instruction from the another communication terminal; and
    instructing the communication terminal to start communication using the selected communication module.

11. An information processing method comprising:
    selecting a communication module from among a plurality of communication modules configured to be capable of conducting a wireless communication, in accordance with whether a mobile communication terminal communicating with an information processing apparatus and including a service that is attempting to conduct the communication is moving away from the information processing apparatus; and
    performing a control so as to start the communication using the selected communication unit.

12. A non-transitory computer readable storage medium storing a program that causes information processing to be performed by a processor, the information processing comprising:

selecting a communication module from among a plurality of communication modules configured to be capable of conducting a wireless communication, in accordance with whether a mobile communication terminal communicating with an information processing apparatus and including a service that is attempting to conduct the communication is moving away from the information processing apparatus; and performing a control so as to start the communication using the determined communication unit.

13. The information processing apparatus according to claim 1, wherein the selected communication module has lower directivity than that of a communication module used before the controller performs the control to start the communication using the selected communication module.

* * * * *